(12) United States Patent
Garde et al.

(10) Patent No.: US 11,187,206 B2
(45) Date of Patent: Nov. 30, 2021

(54) PITCH SYSTEM FOR A WIND TURBINE

(71) Applicant: Vestas Wind Systems A/S, Aarhus N. (DK)

(72) Inventors: Erik Garde, Skødstrup (DK); Daniel Brämer, Aarhus N (DK); Simon Kabus, Viborg (DK); Lasse Godballe Andersen, Hjortshøj (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/649,711

(22) PCT Filed: Oct. 4, 2018

(86) PCT No.: PCT/DK2018/050250
§ 371 (c)(1),
(2) Date: Mar. 23, 2020

(87) PCT Pub. No.: WO2019/076412
PCT Pub. Date: Apr. 25, 2019

(65) Prior Publication Data
US 2020/0256314 A1 Aug. 13, 2020

(30) Foreign Application Priority Data
Oct. 17, 2017 (DK) .......................... PA 2017 70785

(51) Int. Cl.
*F03D 7/02* (2006.01)
*F03D 15/00* (2016.01)
(Continued)

(52) U.S. Cl.
CPC ......... *F03D 7/0224* (2013.01); *F03D 1/0691* (2013.01); *F03D 15/00* (2016.05); *F03D 80/70* (2016.05); *F05B 2270/604* (2013.01)

(58) Field of Classification Search
CPC ...... F03D 7/0224; F03D 15/00; F03D 1/0691; F03D 80/70; F05B 2260/79;
(Continued)

(56) References Cited

U.S. PATENT DOCUMENTS 2,854,958 A * 10/1958 Wood ...................... F15B 15/16
92/53
3,678,810 A * 7/1972 Holmes ................... F16L 39/04
92/119
(Continued)

FOREIGN PATENT DOCUMENTS

CN 206290368 U 6/2017
SE 223429 C1 11/1968
(Continued)

OTHER PUBLICATIONS

Danish Patent and Trademark Office, Search and Examination Report in PA 2017 70785, dated Feb. 28, 2018.
(Continued)

*Primary Examiner* — Woody A Lee, Jr.
*Assistant Examiner* — Jesse M Prager
(74) *Attorney, Agent, or Firm* — Wood Herron & Evans LLP

(57) ABSTRACT

A drive assembly for adjusting the pitch of a wind turbine blade comprises a stator having a cylindrical body and a drive member positioned at least partially within the cylindrical body and movable along an axis thereof. A mounting pin extends through an aperture in a wall of the cylindrical body for pivotally mounting the stator to a wind turbine structure.

13 Claims, 5 Drawing Sheets

(51) Int. Cl.
*F03D 80/70* (2016.01)
*F03D 1/06* (2006.01)

(58) Field of Classification Search
CPC .................. F05B 2270/604; F15B 15/04; F15B 15/1428; F15B 15/1433; F15B 15/1438; F15B 15/1442; Y02E 10/72
See application file for complete search history.

(56) References Cited

U.S. PATENT DOCUMENTS

| | | | |
|---|---|---|---|
| 4,211,150 A | | 7/1980 | Framberg |
| 6,948,417 B2 | * | 9/2005 | Futami ................ F15B 15/1457 92/113 |
| 2007/0272077 A1 | * | 11/2007 | Perkins ............... F15B 15/1461 92/161 |
| 2011/0187104 A1 | | 8/2011 | Numajiri et al. |
| 2012/0063901 A1 | | 3/2012 | Matsuda et al. |
| 2012/0134806 A1 | | 5/2012 | Andersen et al. |
| 2014/0328681 A1 | | 11/2014 | Garde |
| 2015/0110631 A1 | | 4/2015 | Christoffersen et al. |
| 2015/0125295 A1 | | 5/2015 | Perkinson |
| 2015/0152842 A1 | | 6/2015 | Gaile et al. |
| 2015/0176567 A1 | | 6/2015 | Fernandez Falces et al. |
| 2016/0348647 A1 | | 12/2016 | Ebbesen et al. |

FOREIGN PATENT DOCUMENTS

| | | | |
|---|---|---|---|
| WO | 2017133740 A1 | 8/2017 | |
| WO | WO-2017200212 A1 | * 11/2017 | ............. F15B 15/04 |

OTHER PUBLICATIONS

European Patent Office, International Search Report and Written Opinion in PCT Application No. PCT/DK2018/050250, dated Dec. 10, 2018.

* cited by examiner

PITCH SYSTEM FOR A WIND TURBINE

TECHNICAL FIELD

This invention relates to a pitch system for rotating a blade of a wind turbine relative to a hub and to drive assemblies for such pitch systems.

BACKGROUND

Wind turbines typically include a rotor with large blades driven by the wind. The blades convert the kinetic energy of the wind into rotational mechanical energy. The mechanical energy is typically transferred via the drive train to a generator, which then converts the energy into electrical power.

Wind turbines may control power output by rotating each blade around its longitudinal axis, also referred to as its pitch axis, thereby 'pitching' the blades relative to the wind. Accordingly, each blade may be mounted to a hub by a blade bearing that allows relative movement between the blade and the hub. The blades are rotated about their longitudinal axis by a pitch system that includes one or more pitch drives or actuators. Typically pitch systems include one or more pitch drives for each blade to provide the capability to pitch the blades in a controlled way in a combination of collective and cyclic pitch angle adjustments.

Various configurations of pitch systems are known. However, many of these systems are complex and require considerable space in the hub as well as adding considerable weight.

It is against this background that the embodiments of the invention have been devised to provide a more simplified pitch system design that minimises space required in the hub.

SUMMARY

In accordance with the invention, there is provided a drive assembly for adjusting the pitch of a wind turbine blade. The drive assembly comprises a stator comprising a cylindrical body, a drive member positioned at least partially within the cylindrical body and movable along an axis thereof and a mounting pin extending through an aperture in a wall of the cylindrical body for pivotally mounting the stator to a wind turbine structure.

The mounting pin may be a generally cylindrical member and may extend through two diametrically opposed apertures in the wall of the cylindrical body. Additionally or alternatively, the axis of the mounting pin may be substantially perpendicular to the axis of the cylindrical body.

In embodiments, the drive assembly is a hydraulic actuator.

The drive assembly may further comprise an end cap through which working fluid is pumped and wherein the mounting pin extends through the end cap.

The mounting pin may comprise an opening extending therethrough which may be aligned with a corresponding opening in the end cap to allow access to a chamber of the cylinder. The assembly may further comprise a bushing extending from the opening to maintain alignment of the pin.

A pitch system for rotating a blade of a wind turbine relative to a hub may comprise a blade bearing for positioning between the blade and the hub and a drive assembly according to any of the embodiments above. The drive member may be coupled to the bearing such that movement of the drive member causes rotation of the blade bearing.

The drive member may be also coupled to a bearing plate at a position offset from the axis of rotation of the bearing.

In embodiments of the invention, a wind turbine comprises a hub, a blade having a pitch axis and a pitch system according to any of the embodiments above positioned between the blade and the hub for rotating the blade relative to the hub about the pitch axis.

The hub may comprise a mounting structure for mounting the pitch system thereto and the mounting pin extends through the cylindrical body and engages the mounting structure on either side of the cylindrical body.

The mounting structure may be positioned outside of a main cavity of the hub and may comprises two arms extending from an aperture in the hub. The arms may be connected by two plates extending therebetween and the mounting plates may be configured to receive the mounting pin.

DETAILED DESCRIPTION

Figure 1:
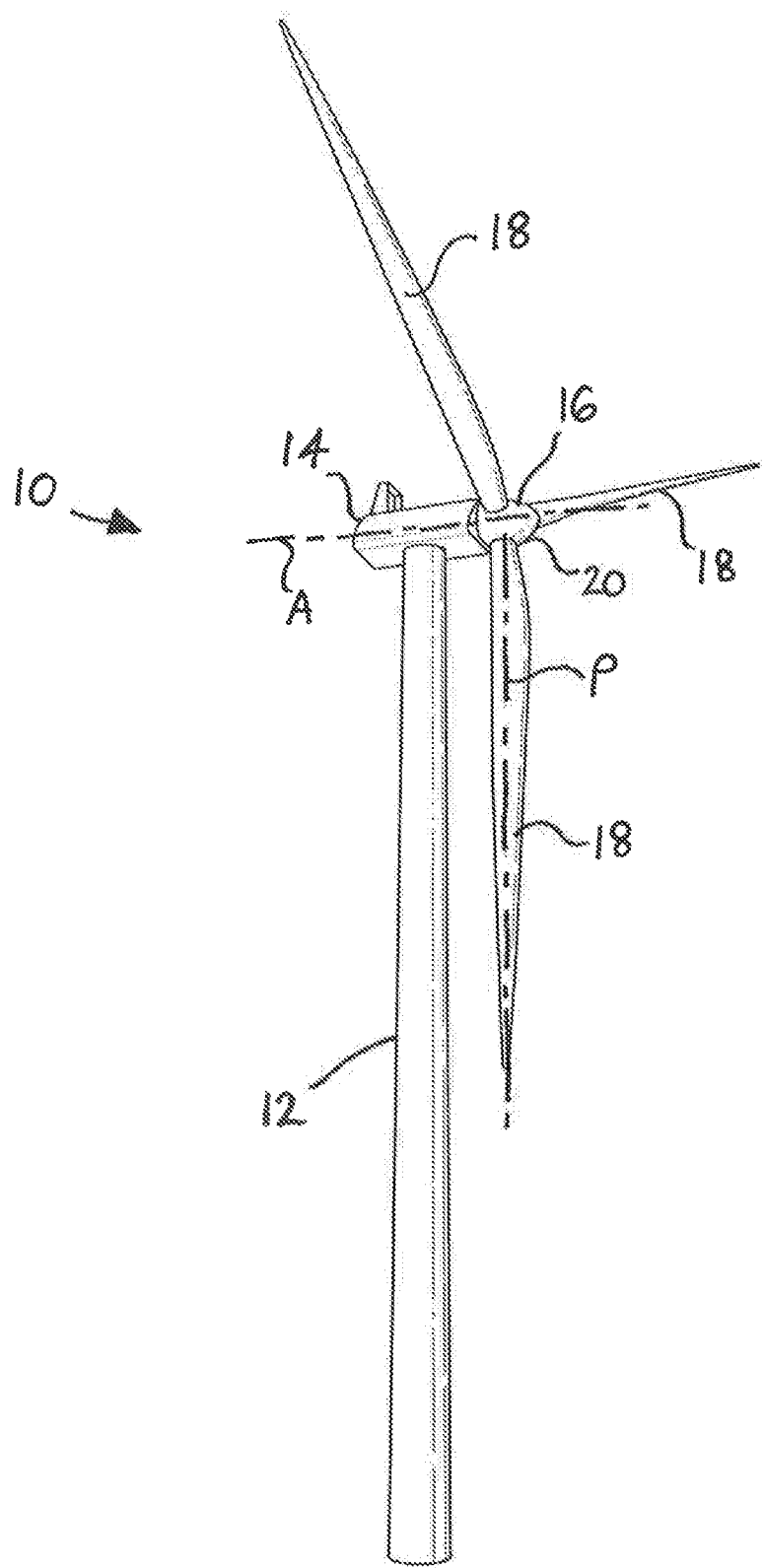
FIG. 1 is a perspective view of a wind turbine.

FIG. 1 shows a wind turbine 10 for generating electricity by wind power. The wind turbine 10 includes a tower 12, a nacelle 14 disposed on top of the tower, a rotor hub 16 disposed on the nacelle 14 so as to be rotatable about a substantially horizontal axis, a plurality of wind turbine rotor blades 18 attached to the hub 16 and extending radially from the horizontal axis A, and electricity-generating equipment (not shown) within the nacelle 14 that generates electricity as the hub 16 rotates. The illustrated embodiment includes three wind turbine rotor blades 18. However, it will be appreciated that the invention is not limited as such and could be applied to wind turbines having two blades or more than three blades.

The wind turbine 10 of FIG. 1 may form part of a plurality of identical or of similar wind turbine generators belonging to a wind farm that serves as a power generating plant connected by transmission lines with a power grid, such as a three-phase alternating current (AC) power grid. Such a power grid generally consists of a network of power stations, transmission circuits, and substations coupled by a network of transmission lines that transmit the power to loads in the form of end users and other customers of electrical utilities. The electrical power is supplied from the generator to the power grid in any manner known to a person skilled in the art.

In order to optimise energy production and improve wind farm safety, each blade 18 of the wind turbine 10 is coupled to the rotor hub 16 in a manner that allows it to rotate relative to the hub, i.e. 'pitch', about a longitudinal axis P of the blade. This is achieved by coupling the root end 20 of the blade 18 to the hub 16 via a pitch bearing and providing a pitch system 22 including a drive assembly, as discussed in further detail below, to control the rotation of the blade 18 according to various inputs or conditions.

Figure 2:
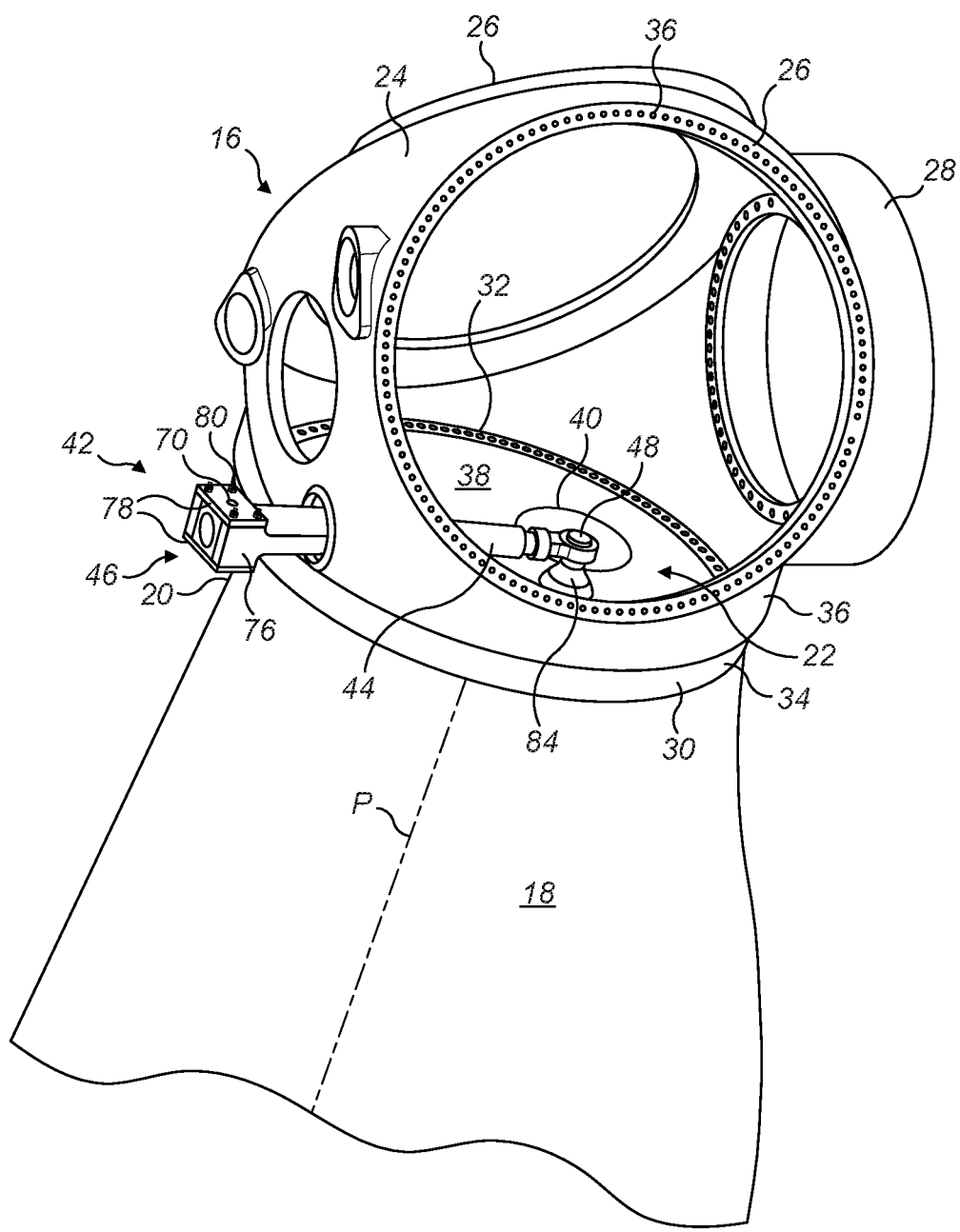
FIG. 2 is a detailed view of the hub of the wind turbine of FIG. 1 with a single blade attached to show the pitch system.

FIG. 2 shows a detailed view of the hub 16 of the wind turbine 10 of FIG. 1. The hub 16 is shown with only one of the three blades 18 attached to it in order to show the pitch system 22 associated with that blade 18. It will be appreciated that a fully assembled wind turbine 10 will include three such wind turbine blades 18 attached to the hub 16 each with a respective pitch system 22 as described below. It should also be appreciated at this point that the arrangement of the hub and its associated components shown in FIG. 2 and described below is provided here to provide context to the inventive concept, and that other hub arrangements are generally known. The hub 16 may also include a cover, for example a glass fibre cover, as shown in FIG. 1 but omitted from FIG. 2 for clarity.

The hub 16 comprises a housing or shell 24 forming a hollow body. The shell 24 comprises three blade flanges 26 to which a respective rotor blade 18 may be mounted and a main shaft flange 28 to which a rotor lock for the main shaft of the turbine (not shown) may be mounted. The rotor blade 18 is mounted to the blade flange 26 of the hub via a blade bearing 30. The blade bearing 30 comprises an inner ring 32, an outer ring 34 and rolling elements (such as balls or rollers, not shown) positioned between the inner and outer rings 32, 34. In some embodiments, the blade bearing 30 comprises at least two rows of rollers between the inner and outer rings 32, 34.

The outer ring 34 of the blade bearing 30 is mounted to the blade flange 26, for example via bolts inserted through bolt holes 36 formed in the blade flange 26. The inner ring 32 of the blade bearing 30 is attached to a root portion 20 of the blade 18. In other embodiments, the outer ring 34 may be mounted to the blade 18 and the inner ring 32 may be mounted to the blade flange 26. A bearing plate 38 is attached to the inner ring 32 of the blade bearing 30 and may provide stiffness and strength and improve other mechanical properties of the bearing 30. The bearing plate 38 includes an aperture 40 to allow access to the inside of the blade 18 from the hub 16.

A drive assembly 42 is functionally attached to the rotor blade 18 and hub 16. The hub 16, blade 18 and drive assembly 42 together form a pitch system configured to change the pitch angle of the rotor blade 18 by applying a force to the rotor blade 18 which causes it to rotate about its pitch axis P. Note that a control system for controlling the pitch system 22 is not shown here, so as not to overly complicate the disclosure.

Figure 3:
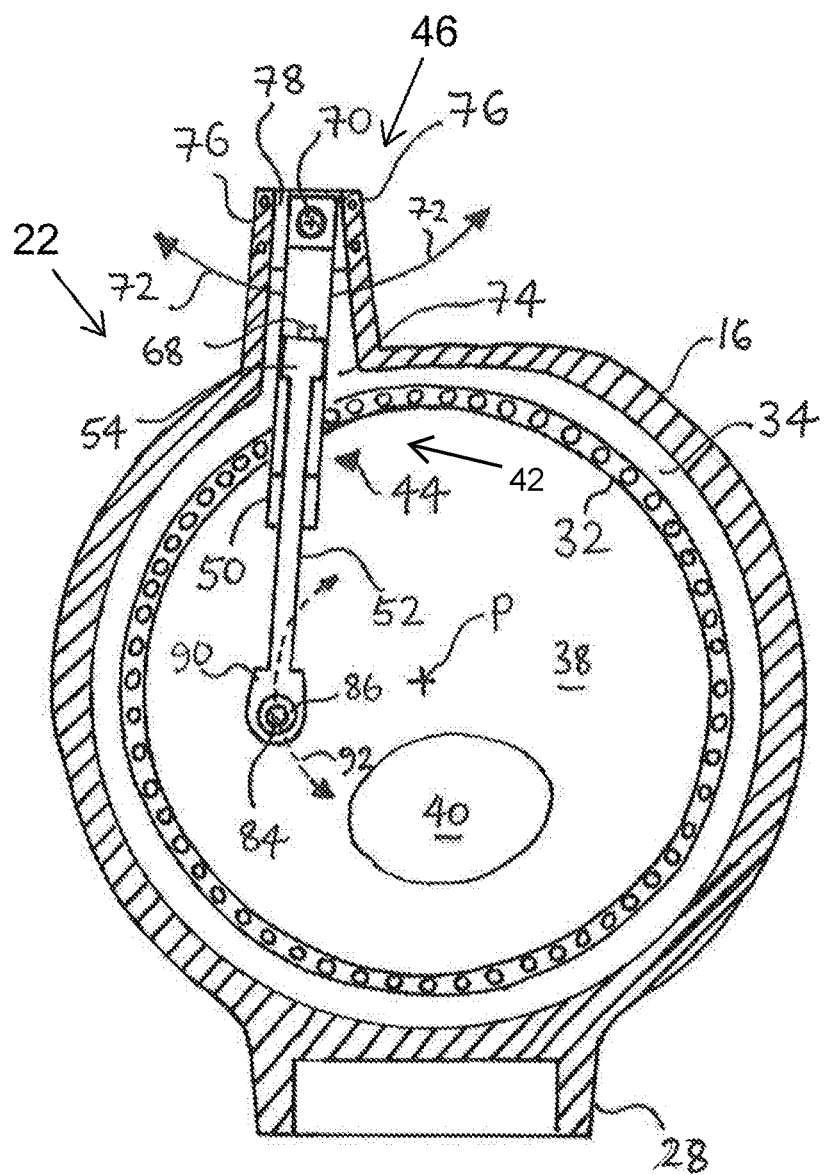
FIG. 3 is a sectional top view of the hub showing a top view of one of the pitch systems.

FIG. 3 is a sectional view of the hub 16 and pitch system 22, showing the relationship between the components in more detail. The drive assembly 42 includes a linear actuator 44 coupled with both the hub 16 and the blade 18 via a mounting arrangement 46, 48 such that linear extension of the actuator 44 causes rotational movement of the blade 18 about its pitch axis P. More particularly, the pitch system 22 includes a hub mounting arrangement 46 and a blade mounting arrangement 48 that allows a degree of rotation of the actuator 44 relative to both the hub 16 and blade 18.

Figure 4:
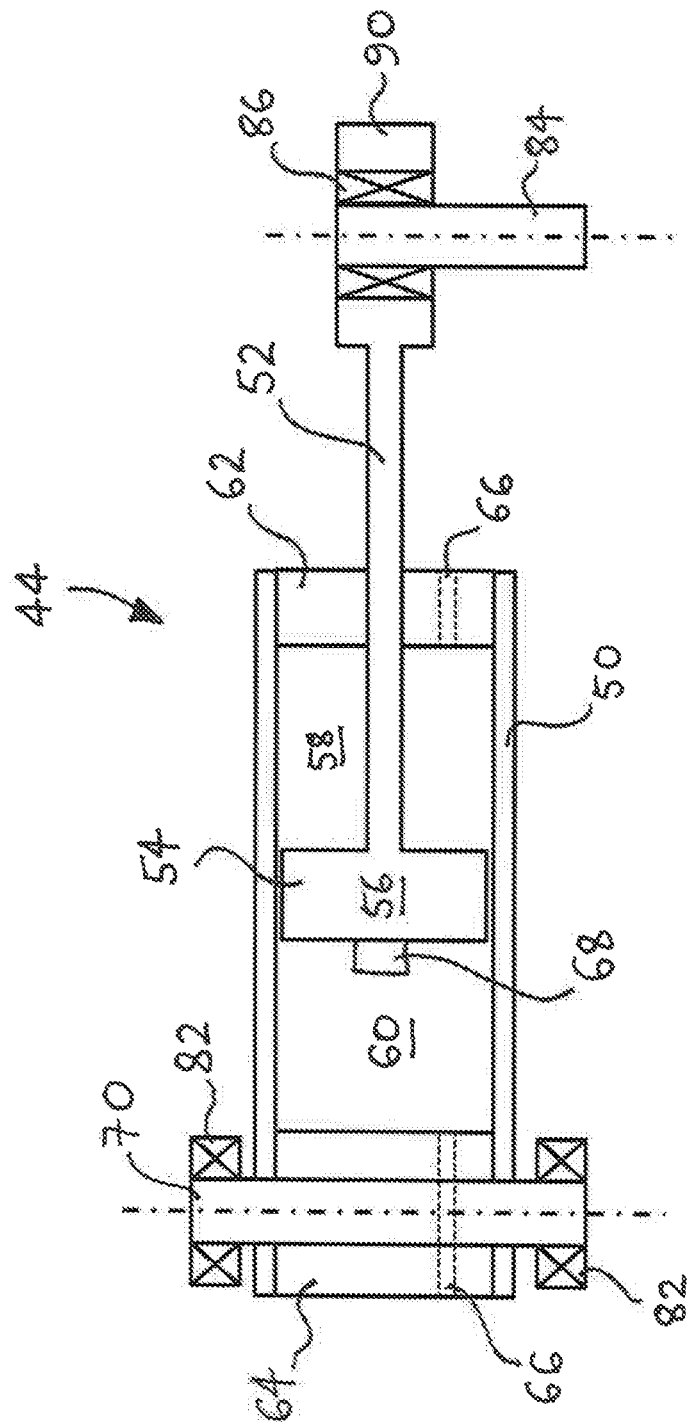
FIG. 4 is a schematic view of the actuator of the pitch system including a mounting pin for mounting the actuator to the hub.

FIG. 4 shows a sectional view of the actuator 44. In the illustrated embodiment, the actuator 44 is a hydraulic actuator having a stator in the form of a cylinder 50 mounted to the hub 16 and a piston rod 52 coupled to the blade 18. As shown in FIG. 3, the piston rod 52 forms part of a piston 54 or drive member that slides relative to the cylinder 50. A plunger 56 of the piston 54 divides the cylinder 50 into first and second chambers 58, 60 sealed at each end by first and second end caps 62, 64.

The piston rod 52 extends from the plunger 56, through the first chamber 58 and out of the cylinder 50. Compressible fluids (e.g. liquids or gases) are provided in each of the first and second chambers 58, 60 via ports 66 extending through the end caps 62, 64. For example, hydraulic fluid may be provided in the first chamber 58 and gas may be provided in the second chamber 60. When the first and second chambers 62, 64 are pressurised such that the forces acting on the piston are in equilibrium, the piston 54 does not move relative to the cylinder 50. Pressurisation of either one of the chambers 58, 60 to cause unequal forces being applied to the respective sides of the plunger 56 causes the plunger 54 to move. Pressurisation of the chambers 58, 60 may be controlled by a hydraulic circuit (not shown) in communication with one or both of the first and second chambers 58, 60.

The piston rod 52 may be formed from stainless steel or other suitable material as is known from the art and may comprise a plurality of seals (not shown) for containment of the working fluid. The actuator 44 may further include a position sensor 68 such as a linear position sensor associated with the piston 54 and in communication with a control module (not shown) of the pitch system (not shown). The control module may operate the hydraulic circuit to position the actuator 44 by any means known in the art.

Referring back to FIGS. 2 and 3, the actuator 44 extends in a direction parallel to a plane defined by the blade bearing 30 and bearing plate 38. In the illustrated embodiment, the actuator 44 extends outside of the hollow cavity of the hub 16 and is connected to the hub 16 at a point outside the cavity. It will be appreciated that other configurations in which the actuator 44 is positioned entirely within the hub 16 are also possible.

One benefit offered by the embodiments of the invention is that a more compact mounting arrangement for the cylinder is achieved. As will be appreciated, the mount for the cylinder is achieved by a pin or shaft that is integrated within the cylindrical body of the cylinder and so this avoids the need for an additional mounting block connected to the end of the cylinder.

In more detail, the actuator 44 is pivotally connected to the hub shell 24 via a mounting pin 70 that is oriented substantially perpendicular to the direction in which the piston rod 52 extends and perpendicular to the plane defined by the blade bearing 30 to allows a degree of lateral movement of the actuator 44 parallel to the plane in the direction of the arrows 72 in FIG. 3.

The hub 16 includes a pitch aperture 74 through which the actuator 44 extends. The pitch aperture 74 has a width that is substantially greater than the width of the actuator cylinder 50 to allow some lateral movement of the cylinder 50 as described above. Two arms 76 extend from the hub 16 either side of the pitch aperture 74. Two mounting plates 78 are attached to the arms 76 either side of the actuator 44 (only one of the plates is shown in FIG. 3). The mounting plates 78 extend between the arms 76 and are secured to them by bolts or other fastening means.

Each mounting plate 78 includes an aperture 80 through which the mounting pin 70 extends. In alternative embodiments the mounting plates 78 each include blind holes, bosses or other feature into which the mounting pin 70 can be positioned such that it can act as pivot for rotation of the actuator 44 about its longitudinal axis. In some embodiments, a bearing 82 (shown in FIG. 4) may be positioned between the mounting pin 70 and the mounting plates 78 to allow greater freedom of rotation of the actuator 44.

The piston rod 52 is coupled to the blade by an axle 84. The axle 84 is fixed to the bearing plate 38 at one end and received in a bearing 86 of the piston rod 52 at another end. In the illustrated embodiment, the axle 84 extends from the bearing plate 38 which itself is coupled with the blade 18 such that a force exerted on the bearing plate 38 by the actuator 44 is transferred to the blade 18. However, in other embodiments the axle 84 may extend directly from a part of the blade 18. The axle 84 is parallel to and offset from the blade pitch axis P such that linear extension or retraction of the piston rod 52 creates a tangential force inducing a torque on the blade 18. Note that this arrangement represents one way in which the piston rod may be coupled to a blade, although the skilled person would appreciate that other arrangements would be possible.

Figure 5:
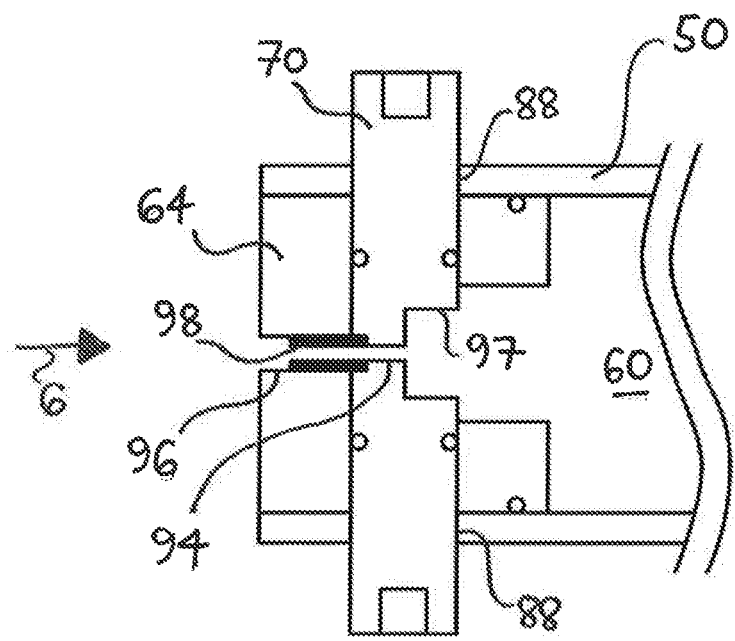
FIG. 5 is a detailed cross-sectional side view of an end of the actuator including a mounting pin.
Figure 6:
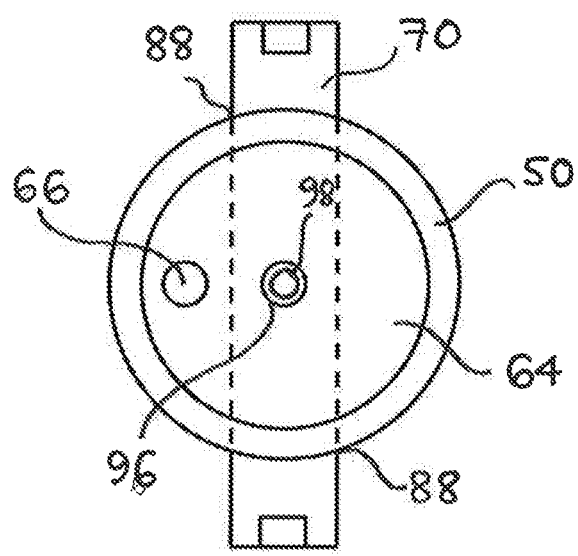
FIG. 6 is a cross-sectional end view of the end of the actuator of FIG. 5 showing the pin extending through it.

FIGS. 5 and 6 show the end of a drive assembly distal from the piston rod, according to an embodiment of the invention, for attachment to the hub 16 as described above. FIG. 5 shows a side view of the actuator 44 and FIG. 6 shows an end view of the actuator 44 viewed in the direction of the arrow 6 on FIG. 5. The end cap 64 is positioned within the cylinder 50 to seal off the second chamber 60. The end cap 64 includes a port 66 (shown in FIG. 6) extending through it for connection to a source of pressurised fluid. The port 66 extends through the end cap 64 in an axial direction but is offset from the central axis of the cylinder 50.

The mounting pin 70 extends through the cylinder 50 laterally. As shown here the mounting pin 70 passes through the walls of the cylinder 50 in a direction generally perpendicular to the axis of the cylinder 50 which is enabled by two diametrically opposed apertures 88. The mounting pin 70 forms a pivot about which the actuator 44 can rotate to allow some lateral movement of the rod 52, in a direction or plane that is generally perpendicular to the longitudinal direction of the rod 52 along the major axis 6. The pivotal mounting of the actuator 44 at each end allows the rod end 90 to follow an arc 92 of the bearing plate 38 (shown in FIG. 3) as it extends from the cylinder 50.

The mounting pin 70 is a generally cylindrical member. In some embodiments it may be solid, but it may also be hollow, like a tube. The primary function of the mounting pin 70 is to extend through the cylinder and protrude from either side thereof so as to provide a pair of projections on which the cylinder may be pivotably mounted. It is envisaged that a circular cylindrical cross section would be most appropriate, although the mounting pin 70 may be formed with other geometrical cross sections.

The mounting pin 70 may be provided with features or formations to enable it to integrate with other functions of the cylinder 50. For example, FIGS. 5 and 6 show the mounting pin 70 comprising an opening 94 extending radially through it. The mounting pin 70 extends all the way through the end cap 64 of the actuator 64. The radial opening 94 in the mounting pin 70 is aligned with an axial opening 96 in the end cap 64 such that the inside of the actuator 44 may be accessed via the two openings 94, 96. In some embodiments, the openings 94, 96 may allow access to a sensor of the actuator, for example. The radial opening 94 of the mounting pin 70 may have a larger diameter portion 97 for receiving the sensor. A bushing 98 may be inserted into the openings 94, 96 of the end cap 64 and mounting pin 70 to prevent rotation of the mounting pin 70 relative to the end cap 64 and thereby maintain alignment. Note that although the opening 96 is shown as open in the figure, in practice it would be sealed by an appropriate component.

The mounting pin 70 may be made from any material capable of supporting the load of the pitch system. In some embodiments, the mounting pin 70 may be made from stainless steel, which may be surface hardened using an appropriate technique, for example chrome plating.

The present invention provides a compact and robust drive assembly for a pitch system in which a mounting pin secures the actuator to the hub. The mounting pin may transfer load from rotation of the blade to the outside structure of the hub and also hold the end cap in place thereby acting against internal hydraulic forces of the cylinder. Since the mounting pin 70 passes all the way through the cylinder 50 and provides mounting projections on either side thereof, this avoids the need to weld or otherwise fasten dedicated trunnions on the surface of the cylinder. The invention therefore provides a less complex way of mounting a hydraulic actuator within a wind turbine hub for actuation of the pitch system. The arrangement also avoids the need for a dedicated mounting block to be provided in addition to the cylinder 50.

It will be appreciated that further modifications of any of the embodiments may be made within the scope of the invention. For example, in some arrangements, there may be no need for a bearing plate on the blade bearing. In such embodiments, the piston rod may be connected directly to the blade or may be indirectly connected to the blade via another feature that allows it to rotate the blade about its axis.

Furthermore, although the illustrated embodiment includes a hydraulic actuator it will be appreciated that other types of linear actuator such as mechanical, ball screw or pneumatic actuators could also be used in this application.

The invention claimed is:

1. A drive assembly for adjusting a pitch of a wind turbine blade, the drive assembly comprising:
   a stator comprising a cylindrical body defined by a wall;
   a drive member positioned at least partially within the cylindrical body and movable along an axis thereof, the drive member defining a first chamber and a second chamber in the cylindrical body;
   an end cap positioned at an end of the cylindrical body to seal off the second chamber; and
   a mounting pin extending through two diametrically opposed apertures in the wall of the cylindrical body for pivotally mounting the stator to a wind turbine structure,
   wherein the end cap includes a port extending therethrough for providing working fluid to the second chamber, the port forming no opening through the wall of the cylindrical body, and
   wherein the mounting pin extends through the end cap.

2. The drive assembly of claim 1, wherein an axis of the mounting pin is perpendicular to the axis of the cylindrical body.

3. The drive assembly of claim 1, wherein the drive assembly is a hydraulic actuator.

4. The drive assembly of claim 1, wherein the mounting pin comprises an opening extending therethrough which is aligned with a corresponding opening in the end cap to allow access to the second chamber of the cylindrical body.

5. The drive assembly of claim 4, further comprising a bushing extending from the opening to maintain alignment of the mounting pin.

6. A pitch system for rotating a blade of a wind turbine relative to a hub, the pitch system comprising:
   a blade bearing for positioning between the blade and the hub; and a drive assembly comprising:
- a stator comprising a cylindrical body defined by a wall;
- a drive member positioned at least partially within the cylindrical body and movable along an axis thereof, the drive member defining a first chamber and a second chamber in the cylindrical body;
- an end cap positioned at an end of the cylindrical body to seal of the second chamber; and
- a mounting pin extending through two diametrically opposed apertures in the wall of the cylindrical body for pivotally mounting the stator to a wind turbine structure, wherein the end cap includes a port extending therethrough for providing working fluid to the second chamber, the port forming no opening through the wall of the cylindrical body, wherein the mounting pin extends through the end cap, and wherein the drive member is coupled to the blade bearing such that movement of the drive member causes rotation of the blade bearing.

7. The pitch system of claim 6, wherein the drive member is coupled to a bearing plate at a position offset from an axis of rotation of the blade bearing.

8. A wind turbine comprising:
a hub;
a blade having a pitch axis; and
a pitch system comprising:
- a blade bearing for positioning between the blade and the hub; and
- a drive assembly comprising:
  - a stator comprising a cylindrical body defined by a wall;
  - a drive member positioned at least partially within the cylindrical body and movable along an axis thereof, the drive member defining a first chamber and a second chamber in the cylindrical body;
  - an end cap positioned at an end of the cylindrical body to seal of the second chamber; and
  - a mounting pin extending through two diametrically opposed apertures in the wall of the cylindrical body for pivotally mounting the stator to a wind turbine structure, wherein the end cap includes a port extending therethrough for providing working fluid to the second chamber, the port forming no opening through the wall of the cylindrical body, wherein the mounting pin extends through the end cap, and wherein the pitch system is positioned between the blade and the hub for rotating the blade relative to the hub about the pitch axis.

9. The wind turbine of claim 8, wherein the hub comprises a mounting structure for mounting the pitch system thereto and the mounting pin extends through the cylindrical body and engages the mounting structure on either side of the cylindrical body.

10. The wind turbine of claim 9, wherein the mounting structure is positioned outside of a main cavity of the hub and comprises two arms extending from an aperture in the hub, the arms being connected by two plates extending therebetween and the plates configured to receive the mounting pin.

11. The drive assembly of 1, wherein an axis of the port is parallel to the axis of the cylindrical body.

12. The drive assembly of claim 11, wherein the axis of the port is offset from the axis of the cylindrical body and does not intersect the mounting pin.

13. The drive assembly of claim 1, wherein an axis of the mounting pin is perpendicular to an axis of the port.

* * * * *